United States Patent [19]

Schleusener

[11] Patent Number: 5,494,593
[45] Date of Patent: Feb. 27, 1996

[54] AMPHOTERIC SURFACTANTS-CONTAINING WAX COMPOSITIONS, THEIR PRODUCTION AND THEIR USE

[75] Inventor: Eckart Schleusener, Reinach, Switzerland

[73] Assignee: Clariant Finance (BVI) Limited, Tortola, Virgin Islands (Br.)

[21] Appl. No.: 363,190

[22] Filed: Dec. 22, 1994

Related U.S. Application Data

[63] Continuation of Ser. No. 93,415, Jul. 19, 1993, abandoned.

[30] Foreign Application Priority Data

Jul. 17, 1992 [DE] Germany ............... 42 23 685.1

[51] Int. Cl.[6] ............... D06M 13/02
[52] U.S. Cl. ............... 252/8.6; 252/8.75; 252/8.8; 252/353; 252/355; 252/357; 106/271
[58] Field of Search ............... 252/8.6, 8.75, 252/8.8, 353, 355, 357; 106/271

[56] References Cited

U.S. PATENT DOCUMENTS

| | | | |
|---|---|---|---|
| 3,519,562 | 7/1970 | Lanner | 252/8.8 |
| 3,749,691 | 7/1973 | Kandathil | 260/29.6 |
| 4,208,345 | 6/1980 | Amati | 260/507 R |
| 4,329,390 | 5/1982 | Danner | 428/264 |
| 4,619,703 | 10/1986 | Gerber et al. | 106/271 |
| 5,093,014 | 3/1992 | Neillie | 252/8.8 |

FOREIGN PATENT DOCUMENTS

| | | |
|---|---|---|
| 0416917 | 3/1991 | European Pat. Off. . |
| 0450706 | 10/1991 | European Pat. Off. . |

OTHER PUBLICATIONS

CA 114:145868W Jul. 29, 1990.
64JP-232085 [Ab] Apr. 23, 1991.
Derwent Abstract of SU1109486-A Aug. 23, 1984.
Derwent Abstract of DE3334575 May 4, 1984.
Derwent Abstract of DE2807130-A Sep. 7, 1978.

*Primary Examiner*—C. Melissa Bonner
*Attorney, Agent, or Firm*—Robert S. Honor; Carl W. Battle; Michael P. Morris

[57] ABSTRACT

Water-dilutable, amphoteric-surfactant-containing wax compositions (P) comprising as wax (W) an oxidized and optionally partially saponified hydrocarbon wax or a mixture of such waxes and as surfactant ($A_1$) at least one amphoteric surfactant that contains one polyethyleneglycolether chain and optionally further surfactants and additions, are excellently suitable as softeners of high hydrophilicity, which are highly compatible with optical brighteners and synthetic resin finishes.

24 Claims, No Drawings

AMPHOTERIC SURFACTANTS-CONTAINING WAX COMPOSITIONS, THEIR PRODUCTION AND THEIR USE

This is a continuation of application Ser. No. 08/093,415, filed Jul. 19, 1993, now abandoned.

In the softening finishing of fibrous material, disturbing effects are often encountered including the diminution of hydrophilicity of the substrate, the incompatibility of softening agents with optical brighteners (which represents a hindrance to the simultaneous optical brightening) or/and especially the yellowing caused by a softening finishing on already optically brightened goods. Further, it is desired in the art that a finishing composition be quickly and well dilutable with water, so that expensive and time-consuming mixing procedures may be avoided. It is also desired that such a product be sufficiently storage stable in its concentrated or also pre-diluted form (e.g. as stock dispersion).

It has now been found that the below-defined, amphoteric-surfactants-containing wax-compositions (P) are surprisingly well-suitable as softening finishing agents, displaying outstanding hydrophilizing activity. Such compositions are compatible with optical brighteners and with optical brightenings and satisfy also the further above-mentioned requirements about dilutability and stability.

The invention relates to these compositions, their production and their use as finishing agents and also to the novel mixtures of amphoteric surfactants.

The invention, thus, provides a water-dilutable wax-composition (P) comprising an amphoteric surfactant, characterized in that it comprises as wax
  (W) an oxidized and optionally partially saponified hydrocarbon wax or a mixture of such waxes and as a surfactant
  ($A_1$) at least-one amphoteric surfactant that contains a polyethyleneglycolether chain.

The waxes (W) are in general carboxylic group-containing oxidized and optionally partially saponified hydrocarbon waxes and comprise in general any synthetic and/or mineral waxes that in their oxidized form still have a wax structure, e.g. oxidized microwaxes or oxidized polyolefin waxes (principally polyethylene waxes) or further waxes that are optionally synthetized directly in the oxidized form, e.g. Fischer-Tropsch waxes, and also their oxidation waxes, and where the mentioned oxidized waxes, especially the oxidized polyolefin waxes and the Fischer-Tropsch waxes, may optionally be partially saponified. Among the mentioned waxes the oxidized and optionally saponified microwaxes, Fischer-Tropsch waxes and polyolefin waxes are preferred. Such waxes are in general known and may be characterized by conventional parameters, such as dripping point, acid value and optionally saponification value, density, needle-penetration, (e.g. according to ASTM-D 1321), molecular weight and solidification point. As (W) come advantageously into consideration oxidized micro-waxes, partially saponified Fischer-Tropsch waxes or oxidized and optionally partially saponified polyethylene waxes, the dripping point of which is preferably above 85° C., in particular within the temperature range of 90° to 130° C., and the acid value of which is advantageously in the range of 5 to 80, preferably 10 to 60 are desirable. The saponification value is advantageously in the range of 10 to 120, preferably 20 to 80. Among the oxidized micro waxes those with a dripping point within the temperature range of 95° to 120° C. are preferred. Among the oxidized, optionally partially saponified polyethylene waxes are preferred those, the dripping point of which is within the temperature range of 102° to 120° C. Among the Fischer-Tropsch waxes are preferred in particular the partially saponified Fischer-Tropsch waxes the dripping point of which is in the temperature range of 85° to 120° C. Among the mentioned waxes are preferred the oxidized, optionally partially saponified polyethylene waxes. The density of the mentioned waxes is advantageously in the range of 0.9 to 1.05 g/cm³ at 20° C., among the oxidized polyethylene waxes those with a density in the range of 0.93 to 1.02 g/cm³ at 20° C. being particularly preferred. The needle penetration according to ASTM-D 1321 of the waxes (W) is advantageously in the range of 1 to 20, preferably 1 to 10. Among the oxidized polyethylene waxes those with an average molecular weight $M_w$ in the range of 1000 to 5000 are particularly preferred.

The waxes (W) are combined with surfactants, at least a part of which are amphoteric surfactants ($A_1$). The surfactants ($A_1$) expediently comprise a lipophilic radical, which is advantageously a high molecular weight hydrocarbon radical, which may e.g. be aliphatic or alkylaromatic, and is optionally linked over a carbonyl group to the hydrophilic portion of the molecule. The lipophilic radical is advantageously a fatty radical or fatty acid radical with 10 to 30, preferably 12 to 24 carbon atoms or an alkyl-substituted phenyl with advantageously 10 to 30, preferably 14 to 24 carbon atoms altogether, in particular mono- or di-($C_{4-12}$-alkyl)-phenyl. The polyethyleneglycolether chains contain advantageously 2 to 70, preferably 3 to 50, in particular 5 to 30 ethyleneoxy units and may optionally contain $C_{3-4}$-alkyleneoxy units and/or a styreneoxy unit. If styreneoxy units are present, preferably not more than one unit is present per polyethyleneglycolether chain; if $C_{3-4}$-alkyleneoxy units are present, there are preferably not more than 5 units thereof per chain. The ethyleneoxy units in the polyglycolether chains amount advantageously to at least 50%, preferably at least 80% of the total of the glycol units of the polyglycolether chain. If styreneoxy units and/or $C_{3-4}$-alkyleneoxy units are present, these may be at the beginning of the respective chain, at the end of the respective chain or between two ethyleneoxy units. With particular preference the polyglycolether chains consist solely of ethyleneoxy units. The lipophilic radicals are advantageously bound directly to the polyglycolether chains to form polyethyleneglycolether chains with lipophilic substitution.

The lipophilic substituted polyglycolether chain is bound, optionally over a non-ionic bridge, to the amphoteric portion of the molecule, which is preferably free of any further polyethyleneglycolether chains and is preferably monocationic. As monocationic there is understood here an amphoteric compound that contains only one covalently bound cationic ammonium group or basic amino group, where the basic amino group is present at least in the form of the inner salt as a cation. Any external, i.e. not covalently bound salt-forming counterions of the anionic groups are not included in this reckoning. The surfactants ($A_1$) employed according to the invention are preferably amphoteric surfactants that in the form of their inner salts correspond to the formula

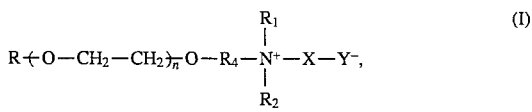

in which

R signifies a radical R' or a radical of the formula R"—CO—, $R_1$ signifies $C_{1-4}$-alkyl, $C_{2-3}$-hydroxyalkyl, benzyl or —X—YM, $R_2$ signifies hydrogen, $C_{1-4}$-alkyl, $C_{2-3}$-hydroxyalkyl, benzyl or —X—YM, or $R_1$ and $R_2$, together with the nitrogen, to which they are bound, form a morpholinium ring, R' signifies an aliphatic hydrocarbon radical with 12 to 24 carbon atoms, R" signifies an aliphatic hydrocarbon radical with 11 to 23 carbon atoms, O-$R_4$ signifies a radical of the formula —O—$CH_2$—CH(OH)—$CH_2$— or —O—$CH_2$—CO—NH—Z—, X signifies $C_{1-4}$-alkylene or β-hydroxy-$C_{3-4}$-alkylene, $Y^-$ signifies —$COO^-$ or —$SO_3^-$, YM signifies —COOM or —$SO_3M$, M signifies hydrogen or a colourless cation, Z signifies $C_{2-6}$-alkylene and n signifies a figure from 5 to 30 and, if the molecule contains more than one radical Y, at most one signifies $SO_3$.

As radicals R"—CO— come into consideration radicals of conventional fatty acids, principally such with 12 to 22 carbon atoms, in particular lauroyl, myristoyl, palmitoyl, oleoyl, stearoyl, arachidoyl or behenoyl or also technical mixtures, in particular the acid radicals of tallow fatty acid or of coconut fatty acid; among the mentioned fatty acid radicals are preferred those with 14 to 22, especially 16 to 22 carbon atoms, before all the saturated ones. As aliphatic hydrocarbon radicals R' there may be mentioned the corresponding fatty alkyl radicals, in particular lauryl, myristyl, cetyl, oleyl, stearyl, behenyl and arachidyl, and technical mixtures consisting mainly of such radicals, in particular the radicals of coconut fatty alcohol, tallow fatty alcohol, cocoalkyl fatty alcohol and tallow-alkyl fatty alcohol, and further also the radicals of branched alcohols, e.g. of isostearyl alcohol or tetramethylnonanol. Among the mentioned hydrocarbon radicals are preferred the linear radicals and especially the saturated radicals, in particular those with 14 to 22 carbon atoms, principally with 16 to 22 carbon atoms, before all stearyl and tallow alkyl.

The $C_{1-4}$-alkyl radicals in the significance of $R_1$ and $R_2$ may be linear or, if they contain 3 or 4 carbon atoms, also branched, namely methyl, ethyl, n-propyl, isopropyl, n-butyl, isobutyl, sec.-butyl and tert.-butyl, among which the lower molecular radicals are preferred, especially methyl and ethyl. As $C_{2-3}$-hydroxyalkyl radicals come, in particular, into consideration those in which the hydroxy group is in β-position, advantageously β-hydroxyethyl and β-hydroxypropyl.

The $C_{1-4}$-alkylene bridges X may be linear or, if they contain 3 or 4 carbon atoms, also branched; particularly worth mentioning are ethylene, methylene, trimethylene, tetramethylene and methyl-substituted ethylene. The β-hydroxy-$C_{3-4}$-alkylene bridges in the significance of X are preferably either β-hydroxy-propylene-1,3 or 2-hydroxy-2-methyl-propylene-1,3, among which β-hydroxy-propylene-1,3 is preferred.

$C_{2-6}$-alkylene in the significance of Z preferably signifies a linear alkylene, in particular di-, tri-, tetra-, penta- or hexamethylene, among which are preferred ethylene and before all propylene-1,3.

In the significance of —O—$R_4$— is preferred —O—$CH_2$—CH(OH)—$CH_2$—.

If M signifies a colourless cation it is advantageously an alkali metal cation (lithium, sodium, potassium) or an ammonium cation [unsubstituted ammonium or low molecular weight aliphatic ammonium, e.g. mono-, di- or tri-($C_{1-2}$-alkyl)-ammonium or mono-, di- or tri-($C_{2-3}$-alkanol)-ammonium] or optionally an equivalent of a magnesium cation or also a mixture of such cations.

The monocationic molecule may contain more than one anionic group, e.g. if $R_1$ and/or $R_2$ represent a radical —X—Y—M; it is, however, preferred that the anionic character does not prevail too strongly and so it is preferred that if more anionic groups are present, which may in particular be sulpho groups and carboxy groups, at most one of these groups is a sulpho group; with particular preference the molecule contains at most two anionic groups, of which at most one is a sulpho group. If the molecule contains two groups Y, preferably both signify carboxy groups; if the molecule contains only one group Y [i.e. if neither $R_1$ nor $R_2$ in formula (I) signifies a radical —X—YM] Y signifies $SO_3$ or preferably COO . With particular preference $Y^-$ is a group —$COO^-$.

$R_1$ signifies preferably $C_{1-4}$-alkyl or $C_{2-3}$-hydroxyalkyl, among which methyl, ethyl and β-hydroxyethyl are preferred. $R_2$ signifies preferably hydrogen, $C_{1-4}$-alkyl or $C_{2-3}$-hydroxyalkyl, among which hydrogen, methyl, ethyl and β-hydroxyethyl are preferred. With particular preference $R_2$ in formula (I) signifies hydrogen.

Particularly preferred compounds of formula (I) correspond in the form of their inner salts to the formula

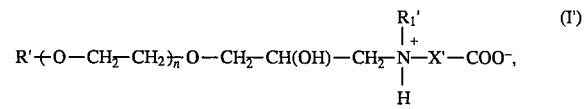

(I')

in which $R_1'$ signifies $C_{1-2}$-alkyl or $C_{2-3}$-hydroxyalkyl and X' signifies $C_{1-4}$-alkylene.

Besides the surfactants ($A_1$) the compositions of the invention may contain further surfactants, in particular (A') at least one monocationic amphoteric surfactant, which is free of polyethyleneglycolether chains and contains at least one lipophilic radical.

As (A') there may be employed known amphoteric surfactants, e.g. such as described in B. R. BLUESTEIN and Clifford L. HILTON "Amphoteric Surfactants" (volume 12 of "Surfactant Science Series", Marcel Dekker Inc., New York and Basel, 1982), especially in chapters 1 to 4.

As lipophilic radicals come into consideration, independently from ($A_1$), those named and, in particular, also preferred under ($A_1$). The lipophilic radicals may be bound to the hydrophilic amphoteric portion, optionally over a non-ionic bridge member, where as bridge members come into consideration in particular those indicated in formula (I) as —O—W— or —CO—NH—Z—. The amphoteric portion is monocationic and may comprise also more than one anionic group, analogously as explained above for (A1). (A') may be quaternary or non-quaternary or a mixture of quaternary and non-quaternary amphoteric surfactants.

Preferably (A') comprises (A2) at least one amphoteric surfactant of the generic betain series, that contains no polyethyleneglycolether chains.

Preferred amphoteric surfactants (A2) correspond in the form of their inner salts to the formula

(II)

in which $R_o$ independently from R signifies a radical R' or a radical of the formula R'—O—W— or of the formula R"—CO—NH—Z— and $R_3$ signifies $C_{1-4}$-alkyl, $C_{2-3}$—hydroxyalkyl, benzyl or —X—YM or $R_1$ and $R_3$ together with the nitrogen to which they are bound signify a morpholinium ring and, if the molecule contains more than one radical Y, at most one thereof signifies $SO_3$.

Analogously as described above for $R_2$ the $C_{1-4}$-alkyl radicals in the significance of $R_3$ may be linear or, if they contain 3 or 4 carbon atoms, also branched; preferred alkyl radicals $R_3$ are ethyl and especially methyl. $C_{2-3}$-hydroxyalkyl stands preferably for β-hydroxyethyl or β-hydroxypropyl, in particular for β-hydroxyethyl. If the molecule contains several radicals X and several groups Y, the respective radicals X and groups Y may be equal or different. Analogously as described for ($A_1$), also for ($A_2$) it is preferred that the anionic character be not too pronounced and thus those compounds of formula (II) are preferred, in which at most one of $R_1$ and $R_3$ signifies a radical —X—YM. If the molecule contains two groups Y, preferably both are carboxylic groups; if the molecule contains only one group Y [i.e. if neither $R_1$ nor $R_3$ in formula (II) signify a radical —X—YM], Y signifies $SO_3$ or preferably COO. Particularly preferred among the surfactants (A2) are those of the carboxyalkyl betain series, i.e. wherein $Y_-$ signifies —COO$^-$ and X signifies $C_{1-4}$-alkylene, before all methylene.

According to a particular further feature of the invention (A') comprises (A3) at least one non-quaternary amphoteric surfactant that contains no polyethyleneglycolether chains.

Preferably the surfactants (A3) correspond in the form of their inner salts to the formula

For the substituents $R_o$ come into consideration, independently from (A2) resp. from the formula (II), the same significances as indicated for $R_o$ in formula (II). If surfactants of formula (II) and also such of formula (III) are present, the respective symbols $R_o$ may have equal significances or different significances.

If besides the surfactants of formula (I) there are also present surfactants of formula (II) and/or of formula (III), the respective symbols $R_1$ may have equal or different significances and the radicals —X—Y$^-$ may have equal or different significances. According to a preferred feature in (A') there are present compounds of formula (II) as well as of formula (III), Y$^-$ in formula (III) signifying preferably —$SO_3^{13}$.

Advantageously the wax compositions of the invention are characterized by a content of (A) an amphoteric surfactant mixture of ($A_1$) and (A'). Preferably (A) is:

($A_{1/2}$), i.e. a mixture of ($A_1$) and ($A_2$), ($A_{1/3}$), i.e. a mixture of ($A_1$) and ($A_3$), or ($A_{1/2/3}$), i.e. a mixture of ($A_1$), ($A_2$) and ($A_3$).

($A_1$), (A2) and ($A_3$) are as defined above.

The invention, further, particularly provides also a mixture of surfactants (A), in particular ($A_{1/2}$), ($A_{1/3}$) or ($A_{1/2/3}$).

The amphoteric surfactants ($A_1$) to be employed according to the invention and the optionally present amphoteric surfactants ($A_2$) and ($A_3$) may be produced according to methods known per se.

The surfactants ($A_1$) may be produced e.g. by introduction of one or more anionic groups into a corresponding more basic-surfactant containing a polyethyleneglycolether chain, in particular a polyethyleneglycolether chain with lipophilic substitution, or by introduction of a polyethyleneglycolether chain with lipophilic substitution, optionally over a suitable non-ionic bridge, into an amphoteric non-quaternary compound which is free of lipophilic radicals and polyglycolether chains, e.g. analogously as described in DE-OS 2 807 130 or in U.S. Pat. No. 3 210 410. The compounds (A1), which in the form of their inner salts correspond to formula (I) and which in the form of external salts may be represented by the following formula

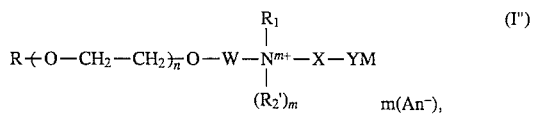

in which

An$^-$ signifies an equivalent of a counterion to the ammonium ion and expediently stands for such an anion as is formed in the synthesis of the product or may be introduced by ionic exchange, e.g. for halide, methosulphate, ethosulphate, tosylate or the anion of a low molecular aliphatic carboxylic acid (e.g. with 1 to 4 carbon atoms, in particular formate, acetate, propionate, oxalate, citrate, lactate or tartrate), $R_2'$ signifies $C_{1-4}$-alkyl, $C_{2-3}$-hydroxyalkyl, benzyl or —X—YM and m signifies 0 or 1, may, in particular, be synthetized by reacting a compound of formula

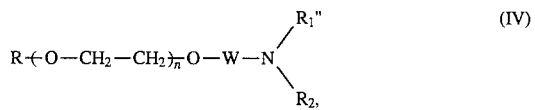

in which $R_1''$ signifies hydrogen, $C_{1-4}$-alkyl, $C_{2-3}$-hydroxyalkyl, benzyl or —X—YM, preferably $C_{1-2}$-alkyl or $C_{2-3}$-hydroxyalkyl, with at least one compound yielding a radical of formula —X—YM    (a).

The compounds of formula (IV) may be synthetized e.g. by condensation of a corresponding lipophilically substituted polyglycolether of formula

with a compound of formula

in which Hal signifies halogen, preferably chlorine or bromine, or of a compound of formula

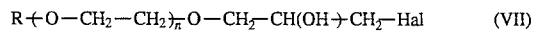

with an amine of formula

in which $R_1''$ signifies hydrogen, $C_{1-4}$-alkyl, $C_{2-3}$-hydroxyalkyl, benzyl or

—X—YM, under dehydrohalogenating conditions.

If in formula (IV) at least one of the two symbols $R_1''$ and $R_2$ signifies a radical of formula (a), also the non-quaternary compounds of formula (I) resp. (I'') may be synthetized in the same way. In formula (VI) —W— signifies advantageously a radical of formula —CH$_2$—CO—NH—Z—.

The intermediate compounds of formula

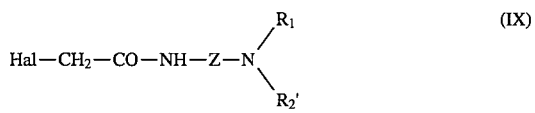

(IX)

may be produced by acylation of amines of formula

(X)

with haloacetic acid halide, preferably chloroacetic acid chloride.

In the compounds of formula (IX) $R_1$ and $R_2'$ preferably do not signify $C_{2-3}$-hydroxyalkyl.

Synthetized non-quaternary compounds of formula (I) or (I'') resp. compounds of formula (IV) that contain at least one radical —X—YM may be reacted by means of alkylation or/and quaternization with corresponding alkylation resp. quaternization agents capable of introducing a $C_{1-4}$-alkyl radical, a $C_{2-3}$-hydroxyalkyl radical or a benzyl radical, to give the corresponding substituted optionally quaternized compounds of formula (IV) in which none of $R_1''$ and $R_2$ signifies hydrogen, resp. of formula (I'') in which m signifies 1.

In an analogous way as the compounds of formula (I) resp. (I''), there may be produced the compounds (A'), in particular such of formula (II) and of formula (III), principally by reaction of corresponding aminocompounds of formula

(XI)

with corresponding compounds yielding a radical (a).

The compounds of formula (XI), in which $R_o$ signifies a radical of formula R'—O—W— and —O—W— signifies —O—CH$_2$—CO—NH—Z—, may be synthetized by reaction of compounds of formula (IX) with corresponding alcohols of formula R'—OH in the form of their alkali metal alcoholates; those in which —W— signifies —CH$_2$—CH(OH)—CH$_2$— may e.g. be synthetized by reaction of compounds of formula R'—O—CH$_2$—CH(OH)—CH$_2$—Hal    (XII).

with corresponding amines of formula (VIII). These reactions take place under dehydrohalogenating conditions. The compounds of formula (XI), in which $R_o$ signifies a radical of formula R''—CO—NH—Z— may be produced by acylation of corresponding amines of formula (X) with an acylating agent capable of yielding the radical R''—CO—.

For the production of compounds of formula (II) there are advantageously employed such compounds of formula (XI) resp. precursors in which $R_1''$ and $R_2$ do not signify hydrogen or, if one or both signify hydrogen there are introduced either at least one further group —X—YM or/and it is quaternized with a quaternizing agent capable of introducing a $C_{1-4}$-alkyl radical, a $C_{2-3}$-hydroxyalkyl radical or a benzyl radical.

For the production of the compounds of formula (III) there are expediently employed compounds of formula (XI), in which $R_2$ signifies hydrogen.

The compounds of formulae (VII) and (XII) may be produced in a manner known per se by reaction of the respective alcohols of formulae (V) or R'—OH with epihalohydrin, in particular epichlorohydrin, in which the reaction takes place preferably at elevated temperature (e.g. in the temperature range of from 50° to 100° C.) and in the presence of a suitable catalyst (e.g. borontrifluoride-etherate) under practically anhydrous conditions. The acylation of the amines of formula (X) with haloacetic acid halide for the production of compounds of formula (IX) or with an acid of formula R''—COOH or a suitable functional derivative thereof, preferably a halide (in particular chloride), takes place under conditions known per se, avantageously at elevated temperature (e.g. in the temperature range of from 50° to 100° C., preferably 55° to 90° C.), preferably in the presence of an inert solvent (e.g. of a mono- or di-alkyleneglycol or a monoalkylether thereof) or/and in the presence of water.

The reaction of the amines of formula (VIII) with the respective halides of formulae (VII) or (XII) takes place expediently under dehydrohalogenating conditions, advantageously in the presence of a strong base (e.g. alkali metal hydroxide, e.g. sodium hydroxide or potassium hydroxide), advantageously at elevated temperature, e.g. in the temperature range of from 50° to 100° C., preferably 55° to 90° C. Also the dehydrohalogenating reaction of the compounds of formulae (VI) resp. (IX) with corresponding alcohols may be carried out under such conditions, for which the alcohols are advantageously employed in the form of their alkali metal alcoholates.

Optionally the compounds of formula (III) in which $R_o$ signifies a radical R''—CO—NH—CH$_2$—CH$_2$— may be cyclized to the respective imidazoline.

As reactants that are capable of yielding a radical of formula (a) come in general into consideration conventional alkylating agents carrying as substituent a radical —YM or in which the substituent —YM may be introduced subsequently to the alkylation. There may be mentioned especially the following (a)-yielding products: ethylenically unsaturated aliphatic carboxylic acids with 3 or 4 carbon atoms, in particular acrylic acid, methacrylic acid or crotonic acid, cyclic alkane sultones, in particular propane sultone und butane sultone, and with particular preference compounds of formula Hal—X—YM    (XIII).

Among the compounds of formula (XIII) are especially preferred the respective chloroalkane carboxylic acids (e.g. chloroacetic acid, chloropropionic acid, chlorobutyric acid and chlorovalerianic acid), chloro-$C_{2-4}$-alkane sulphonic acids (e.g. chloroethane sulphonic acid and chloropropane sulphonic acid) and β-hydroxy-(chloro-$C_{3-4}$-alkane) sulphonic acids, in particular 3-chloro-2-hydroxypropane-1-sulphonic acid. The introduction of a sulphomethyl group or of a sulphoethyl group may also be brought about by successive reaction with a corresponding aldehyde (formaldehyde or acetaldehyde) and a suitable sulphite (e.g. sodium bisulphite). The introduction of a β-hydroxypropanesulphonic acid group may also be brought about by successive alkylation with epichlorohydrin to the epoxypropane-substituted compound and reaction with a suitable sulphite (e.g. sodium bisulphite) to produce the respective β-hydroxypropane-γ-sulphonic acid. The alkylation reactions may be carried out in a manner known per se, expediently at elevated temperature, e.g. at temperatures in the range of 50° to 100° C., preferably 55° to 90° C., in which for the reaction of compounds of formula (XIII) the reaction is carried out advantageously in the presence of an additional base (e.g. alkali metal hydroxide), in order to facilitate respectively accelerate the dehydrohalogenation. The cyclic sultones and the ethylenically unsaturated acids (resp. their salts) are suitably employed if the respective amino compound [for instance of formula (IV) or (XI)] contains at least one reactive hydrogen, i.e. if at least one of $R_1''$ and $R_2$ in these compounds signifies hydrogen; also the reaction with formaldehyde resp. acetaldehyde takes place suitably at such amino compounds that contain a reactive hydrogen. If a subsequent alkylation or quaternization for introduction of a corresponding radical $R_2'$ or $R_3$ having another significance than —X—YM is desired, suitable alkylations resp. quaternizations may be carried out after the introduction of the radicals (a). Such quaternizations may be carried out employing corresponding conventional quaternizing agents, e.g. with corresponding halides or sulphates, principally $C_{1-4}$-alkylhalides, dimethylsulphate, diethylsulphate or benzylhalide. Such quaternizations may be carried out in a manner known per se; in particular as indicated above for the reaction with compounds of formula (XIII). In general the dehydrohalogenations and quaternization reactions may be carried out in the presence of a solvent, for instance in aqueous or aqueous/organic medium, for which come into consideration as organic solvents expediently aprotic solvents that are miscible with water, in particular those mentioned above.

According to a preferred feature of the invention the surfactant mixtures (A), in particular $(A_{1/2})$ are produced in such a way that the introduction of the radicals (a) takes place as the last reaction and is carried out on a mixture of the respective intermediate products containing polyglycolether chains and free of polyglycolether chains, in particular on a mixture of compounds of the formulae (IV) and (XI). If desired, in single cases there may also be produced the mixtures of compounds of formulae (IV) and (XI) together e.g. by reaction of mixtures of compounds of formulae (VII) and (XII) with corresponding amines of formula (VIII) or by reaction of a mixture of compounds of formula (V) and of formula R'—OH with compounds of formula (VI), in particular (IX). In order to better control the degree of quaternization it is, however, preferred that the respective compounds of formula (IV) and (XI) are produced separately and then the reaction with the (a)—yielding compounds, in particular with compounds of formula (XIII), is carried out in mixture, so that e.g. a preferred mixture of non-quaternated compounds of formula (I) resp. (I") and quaternary compounds of formula (II) is formed.

The weight ratio $(A_1)/(A')$ is advantageously in the range of 0.1/1 to 5/1, preferably in the range of 0.2/1 to 5/1, more preferably in the range of 0.3/1 to 2.4/1, in particular in the range of 0.5/1 to 2.5/1. If (A') consists, according to a preferred feature, of ($A_2$) the weight ratio $(A_1)/(A_2)$ in the respective surfactant mixture $(A_{1/2})$ is advantageously in the range of 0.2/1 to 5/1, preferably in the range of from 0.5/1 to 2.5/1. With particular preference $(A_1)$ amounts to at least one third by weight of the total amphoteric surfactants $(A_1)+(A')$ present.

The weight ratio of the total amphoteric surfactants (A) present to the waxes (W) is advantageously in the range of 0.5/1 to 5.5/1, preferably 1/1 to 4/1. If (A'), according to a preferred feature, consists of ($A_2$) the respective weight ratio $(A_{1/2})/(W)$ is advantageously in the range of 0.5/1 to 5/1, preferably in the range of 1/1 to 3.5/1. The weight ratio $(A_1)/(W)$ is advantageously in the range of 0.1/1 to 4/1, preferably in the range of 0.2/1 to 2.5/1.

The mixtures of (W) and ($A_1$) according to the invention, in particular of (W) and (A), may be produced by admixing the respective components expediently in the melt and optionally diluting the melt with water to produce an aqueous dispersion (D), or a portion of the amphoteric surfactants, in particular of the kind ($A_2$) or ($A_3$), may also be added separately e.g. in the form of aqueous solution or dispersion.

If desired there may be added further surfactants to the compositions of the invention, in particular (B) at least one non-ionic surfactant, at least one weakly cationic surfactant or/and at least one weakly anionic surfactant.

The surfactants (B) may e.g. be hydrophilic surfactants ($B_1$), i.e. having dispersant resp. emulsifyer character or protective colloid character, or more hydrophobic surfactants ($B_2$), i.e. as conventionally employed in the finishing of textile material, e.g. as softeners or/and antistatic agents and which are principally (B2'), i.e. nitrogen-containing fatty acid derivatives or (B2"), i.e. fatty acid mono- or diglycerides of preferably $C_{14-20}$ fatty acids.

Emulsifyers resp. dispersants or protective colloids of the kind ($B_1$) of non-ionic or weakly cationic character are known in large number in the art and also described in the specialized literature, e.g. in M. J. SCHICK "Non-ionic surfactants" (vol. 1 of "Surfactant Science Series", Marcel Dekker Inc., New York, 1967). Suitable non-ionic or weakly cationic dispersants, emulsifyers or protective colloids ($B_1$) are principally oxyalkylation products of fatty alcohols, fatty acids, fatty amines, fatty acid mono- or dialkanol amides (in which "alkanol" signifies in particular "ethanol" or "isopropanol") or fatty acid partial esters of tri- to hexafunctional aliphatic polyols, wherein as oxyalkylation agents come into consideration known oxiranes, especially $C_{2-4}$-alkyleneoxides and optionally styreneoxide, and at least 50% of the introduced oxyalkyl units are oxyethyl units. Advantageously at least 80% of the introduced units are oxyethyl units; most simply all introduced oxyalkyl units are oxyethyl units. The starting materials for the addition reaction of the oxyalkyl units (fatty acids, fatty acid mono- or dialkanol amides, fatty alcohols, fatty amines or fatty acid polyol partial esters) may be any conventional products as employed for the production of such surfactants, principally having 12 to 24 carbon atoms in the fatty radical, and where as fatty radicals come in particular into consideration the ones listed above for R. As fatty acid mono- or dialkanol amides there may be mentioned e.g. the mono- or dialkanol amides of the mentioned fatty acids. As fatty amines and fatty alcohols there may be mentioned the corresponding derivatives of the respective above-mentioned fatty acids, resp. of their amides, as well as synthesis alcohols (e.g. tetramethylnonanol) and branched aliphatic amines. As partial esters of the mentioned polyols there may be mentioned for instance the mono- or di-fatty acid esters of glycerine, erythritol, sorbitol or sorbitan, in particular the sorbitan mono- or di-oleates or -stearates. As starting products there may be employed for instance also technical mixtures, e.g. tallow fatty acid, technical soybean oil acid, technical oleic acid and coconut fatty acid and their hydrogenation or destillation products as well as the mono- or dialkanol amides, alcohols, amines and polyol partial esters derived therefrom. Among the mentioned products ($B_1$) are preferred the oxyalkylated fatty alcohols. The degree of oxyethylation is advantageously in the range of 2 to 100, preferably 2 to 70. As non-ionic or weakly anionic surfactants there may also be mentioned lecithine derivatives, in particular lecithinhydrolysates, principally hydrolysates of soybean-lecithin.

As surfactants ($B_2$) come in particular into consideration low-oxyalkylated or non-oxyalkylated non-ionic or weakly cationic fatty acid derivatives, principally such as known as softeners or/and as antistatic agents; as ($B_2'$) advantageously acylation products of mono- or di-alkanol amines, in particular mono- or diethanol amine, or of alkanolaminoalkylamines, in particular ethanolaminoethylamine or ethanolaminopropylamine, with higher fatty acid radicals, in particular such as listed above; as ($B_2''$) advantageously fatty acid mono- or di-glycerides in which the fatty acid radicals contain advantageously 14 to 20, preferably 16 to 18 carbon atoms and are more preferably saturated, most preferably the degree of esterification of glycerine being in the range of 1.0 to 1.7, more preferably 1.1 to 1.5.

The total content of components (B) is advantageously chosen so that (B) does not outweigh the total of the remaining components (W) and (A) in the composition of the invention, and preferably so that the total content of ($B_1$) is not larger than the total content of (W). In the (B)-containing compositions the content in ($B_1$) is advantageously in the range of 2 to 50% by weight of (W); the content of ($B_2$) is e.g. in the range of 0 to 200% by weight of (W); the content of ($B_2'$) is advantageously in the range of 0 to 50% by weight, preferably 2 to 40% by weight of (W), and the content of ($B_2''$) is advantageously in the range of 0 to 200, preferably 2 to 140% by weight of (W).

If desired, the compositions of the invention may contain further additions as they may be specifically desired for storage, shipment or application, or as may occur due to the production by certain processes (e.g. such as employed solvents or catalysts or non-separated by-products). In particular the compositions of the invention may contain (C) a defoamer, at least one oil, at least one solubilizer or/and at least one fluidizing agent.

As defoamers there may, e.g. be mentioned such of the silicone series, of the paraffin series, of the phosphoric acid tri-(alkyl)ester series or of the higher (iso)alkanol series. As oils there may be mentioned in particular mineral oils, resp. paraffin oils, e.g. those with a boiling range above 140° C., in particular within 140° and 300° C. As solubilizers come into consideration in particular non-ionic, aprotic water-miscible solvents, e.g. hexyleneglycol. As fluidizing agents come, in particular, into consideration cumol sulphonates, more particularly their alkali metal salts, preferably the sodium salt.

The total content of additives (C) in the compositions of the invention is preferably not greater than the total content of (W) and is advantageously in the range of 0 to 80%, referred to the weight of (W).

As already indicated above, the compositions of the invention may advantageously be produced by mixing the components (W) and ($A_1$) and advantageously at least a portion of the components (A') in the melt, e.g. at temperatures in the range of from 75° to 180° C., preferably 78° to 140° C. To the obtained melt there may be also added the further desired components, in particular (B) and/or (C). The compositions of the invention may be handled, in particular shipped resp. stored, in the form of anhydrous (i.e. dry) compositions (T). It is also of advantage to dilute the produced composition with water, in order to produce therefrom readily stirrable and pourable stable dispersions (D). If desired, a portion of the additives, in particular additives of the kind (B) and/or (C), may be added after the addition of water or of a portion of the water, in particular if the product is produced directly in the form of aqueous dispersion (D). Such aqueous dispersions (D) have advantageously a high content of dry substance; preferably the content of (W) is in the range of 1 to 30% by weight, principally 1 to 15% by weight, especially 2 to 12% by weight, referred to the weight of the total dispersion (D). The pH of the aqueous dispersions (D) is advantageously in the range of from 4 to 8.5, preferably in the range of from 4.5 to 8, and may, if required, be adjusted, e.g. by addition of suitable acids or bases, e.g. with a mineral acid or a $C_{1-4}$ aliphatic carboxylic acid or with alkali metal hydroxides or/and low-molecular aliphatic hydrosoluble amines, principally mono-, di- or tri-alkanol amines (mono-, di- or triethanol amine or mono-, di- or triisopropanol amine). The dispersions (D) may be in the form of relatively dense but still pourable suspensions up to fluid dispersions. The water content of (D) is advantageously in the range of 10 to 92% by weight, preferably 40 to 85% by weight, referred to the total weight of (D).

The compositions (P) of the invention—be it in the form of dry compositions (T) (as dry, there is intended here a composition, the water content of which is <10% by weight, preferably ≦5% by weight), be it as aqueous dispersions (D), especially as concentrated dispersions (D)- are distinguished by their storage stability and stability to shipment even under conditions of frost or heat (if an aqueous dispersion freezed under extreme conditions of frost it may, upon thawing-up, be brought again to the original dispersed form by simple stirring) and are readily dilutable with water [the solid compositions may be turned into the form of dispersions (D) as described above, especially of concentrated dispersions as preferred above by stirring in water at elevated temperatures, preferably at temperatures in the range of 70° to 95° C., and these dispersions may then be further diluted with water as desired].

The wax compositions (P) of the invention may in general be employed in any field, in which dispersed waxes are usable, e.g. in polishes or coatings. They are, however, particularly suitable for the finishing of fibrous material, especially textile material, from aqueous medium. They serve for improving the soft handle and are consequently usable especially as textile softeners. They are distinguished especially by their compatibility with anionic components of the treatment liquor, in particular with anionic optical brighteners and are therefore also correspondingly well-suitable for the softening finishing of white goods.

As substrates for the finishing process of the invention are suitable any natural, fully synthetic or semi-synthetic materials, e.g. of natural or modified cellulose, of natural or synthetic polyamides, of polyester, polypropylene, polyurethane or polyacrylonitrile, or of blends of such materials. The substrate may be in any processing form as conventionally employed for softening finishing, e.g. as loose fibres, filaments, yarns, yarn strands or bobbins, woven or knitted goods, webs, fleeces, felts, velvet, carpets, terry clothes or tuftings, or even half-ready and ready made goods and further also artificial leather. Since the compositions of the invention display an excellent hydrophilicity behaviour on the substrate they are particularly suitable for the softening finishes of substrates of higher hydrophilicity; in particular of wool, silk and, before all, cellulose (e.g. cotton, linen, hemp, ramier, sisal), terry cloth being particularly worth mention.

The finishing is expediently carried out from aqueous, advantageously weakly acidic to weakly alkaline, medium, in particular at pH values in the range of from 4 to 9, preferably 4.5 to 8. The concentration of the compositions of the invention, referred to the substrate, may vary broadly depending on the kind and consistency of the substrate, method of application and desired effect and is advantageously in the range of 0.03 to 3, preferably 0.06 to 1.5% by weight of dry substance, referred to the dry weight of the substrate. The finishing method of the invention takes place advantageously as last finishing step of the material, preferably subsequently to an optical brightening or/and dyeing procedure, optionally simultaneously with or after an additional treatment, e.g. a permanent finishing of the fibrous material.

The finishing of the invention may be carried out by any processes conventional per se, e.g. by exhaustion or preferably by the impregnation method. In exhaustion processes there may come into consideration processes from long liquors as well as from short liquors, e.g. at liquor-to-goods ratios in the range of 100:1 to 0.5:1, in particular 60:1 to 2:1. The temperature of application in the exhaustion method may also be in usual ranges, e.g. in the range between ambient temperature and 60° C., preferably in the range of from 25° C. to 50° C. Impregnation may also be carried out according to methods conventional per se, e.g. by dipping, padding, spraying, application with a doctor blade or of foam; with particular advantage for the process of the invention there are employed dipping or padding methods. After the impregnation or exhaustion step the treated materials may be dried in conventional way, e.g. at 30° to 180° C., preferably 60° to 160° C.; if a synthetic fibrous substrate is further to be fixed, this may be carried out simultaneously or subsequently to the finishing of the invention (depending on the substrate e.g. in the temperature range of 160° to 220° C.) or, if a synthetic resin finish is carried out simultaneously with the finishing of the invention, the thermic after-treatment may be carried out e.g. in the temperature range of from 120° to 220° C. and in this the further thermal after-treatment corresponds to the cross-linking resp. condensation temperature of the resin and is, in particular, in the range of from 160° to 190° C. In synthetic resin finishings of cotton, the impregnated goods may advantageously be intermediately dried for a few seconds at 120° to 140° C. and then condensation may be carried out at higher temperatures, preferably at 170° to 190° C.

As already indicated, the finishing of the invention may also be carried out simultaneously with an optical brightening and/or a synthetic resin finishing, which is of particular economic advantage for cellulosic substrates.

As optical brighteners come into consideration in general any water-dispersible or soluble optical brighteners as suitable for the optical brightening of the corresponding substrates from aqueous liquor, principally anionic optical brighteners. With particular preference cellulosic substrates are optically brightened with anionic optical brighteners of the 4,4'-bis-(s-triazinylamino)-stilbene-2,2'-disulphonic acid series. Such optical brighteners are well-known in technique and also described to a large extent in literature, e.g. in German Patents 11 06 334, 11 70 765, 17 95 047 and 19 39 521, in German laid-open Patent Applications 19 63 065, 20 56 195, 21 45 384, 22 33 429, 24 03 455, 24 06 883, 24 30 624, 26 01 749 and 27 15 864 and in Belgian Patent 754 466, among which are particularly preferred those described in DE-OS 21 45 384 and 24 30 624.

The concentration of optical brighteners referred to the brightened substrates may be in the conventional ranges.

For the synthetic resin finishings are suitable any conventional synthetic resin components as they are employed for the finish of textile materials, in particular cellulosic materials, principally those yielding synthetic resin finishes of non-ionic or basic-character. Such synthetic resin finishes resp. synthetic resin finish components and processes are known in technique and described in literature to a large extent, e.g. in Dr. M. W. RANNEY "Crease-Proofing Textiles" (Textile Processing Review, Nr. 2, NDC 1970), in CHWALA/ANGER "Handbuch der Textilhilfsmittel", Verlag Chemie, Weinheim, New York, 1977 (chapter 3.16.4 thereof for synthetic resins and chapter 3.16.5 thereof for the corresponding catalysts) or in the German laid-open Patent Applications 31 37 404, 32 16 745, 32 16 913 and 33 30 120 and in the laid-open PCT-Patent Application WO 81/02423. Preferred categories of synthetic resins are (according to the subdivision of CHWALA/ANGER): methylol-urea, bis-(methoxymethyl-urea), poly(methylol)-melamin, 1,3-bis(hydroxymethyl)-imidazolin-2-one, blends of 1,3-bis(hydroxymethyl)-imidazolin-2-one and poly(methylol)-melamine, 5-substituted 1,3-dimethylol-1,3,5-hexahydrotriazin-2-one (triazone), bis(methoxymethyl)-urone, dimethylolproplene-urea, cyclic 1,3-dimethylol-4,5-dihydroxyethylene-ureas and related compounds and methylolcarbamates and further reaction products of polyalkylenepolyamines, in particular diethylenetriamine, with dicyanodiamide and (in the presence of catalysts such as $MgCl_2$) with optionally hydroxy-substituted N-methylol-alkylene-ureas, in particular N,N'-dimethylol-ethylene- or -propylene urea or N,N'-dimethylol-dihydroxyethylene urea. The concentration of synthetic resin and catalyst may range in conventional ranges as required for the desired synthetic resin finish.

The selection of a wax composition (P) of the invention and the quality of the respective finish of the invention are neither dependent on nor conditioned by the selection of the synthetic resin finish.

By the process of the invention there may be achieved finishings of excellent soft-handle and hydrophilicity behaviour whereby optical brightenings, in particular as described above, are practically not impaired by the finishing of the invention and optical brighteners present in the liquor are not destabilized by the softener composition of the invention but may be readily applied to the substrate together with the softener. By the finishing of the invention there may furthermore be also improved the mechanical workability of the substrates (e.g. the sewability and the roughening of flat or tubular textile goods), by a suitable formulation of the compositions of the invention with surfactants of the kind $(A_2)$ or/and $(A_3)$ or also (B), in particular $(B_2)$, there may also be achieved an improved antistatic behaviour, before all in the finishing of synthetic fibres or modified natural fibres.

In the following examples parts and percentages are by weight; the temperatures are indicated in degrees Celsius.

There are employed the following waxes and surfactants:

Waxes (W): $(W_1)$ oxidized polyethylene wax with dripping point=103° C., acid value=25 and density at 20° C.=0,96 g/cm³ (HOECHST-Wachs PAD 522);

Surfactants $(A_1)$ of the following formulae (in the form of the free acids resp. inner salts):

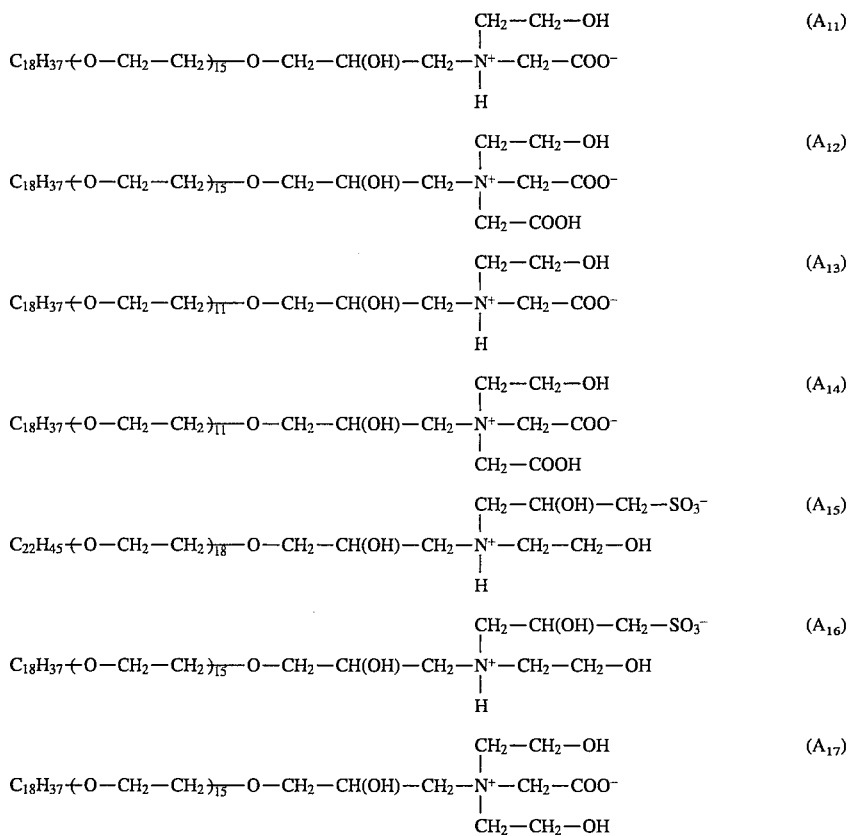

$C_{18}H_{37}$ = stearyl
$C_{22}H_{45}$ = behenyl.

Surfactants ($A_2$) of the following formulae (in the form of the free acids resp. inner salts):

(A$_{21}$)

(A$_{22}$)

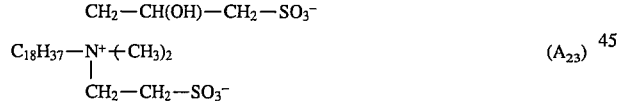
(A$_{23}$)

(A$_{24}$)

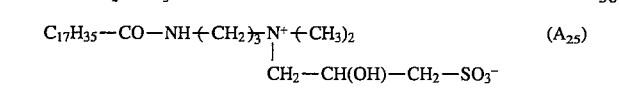
(A$_{25}$)

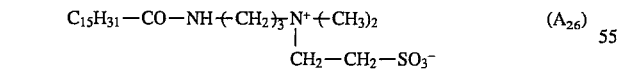
(A$_{26}$)

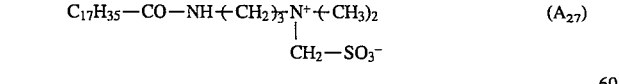
(A$_{27}$)

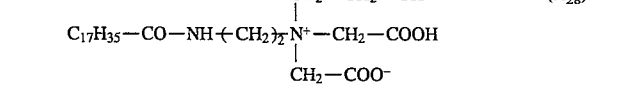
(A$_{28}$)

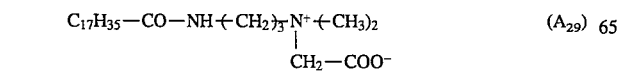
(A$_{29}$)

-continued $C_{15}H_{31}-CO-$ = palmitoyl
$C_{17}H_{35}-CO-$ = stearoyl
$C_{18}H_{37}-$ = stearyl.

Surfactants ($A_3$) of the following formulae (in the form of the free acids resp. of the inner salts):

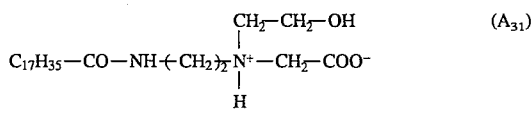
(A$_{31}$)

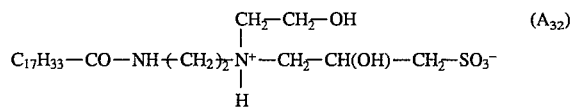
(A$_{32}$)

$C_{17}H_{33}-CO-$ = oleoyl
$C_{17}H_{35}-CO-$ = stearoyl.

Surfactants ($B_1$):

($B_{11}$) addition product (in the indicated sequence) of 2 moles of ethyleneoxide, 4 moles of propyleneoxide and 7 moles of ethyleneoxide to 1 mole of tetramethylnonanol;

($B_{12}$) addition product of 60 moles of ethyleneoxide to 1 mole of oleylalcohol;

($B_{13}$) addition product of 10 moles of ethyleneoxide to 1 mole of stearylalcohol;

($B_{14}$) soybean-lecithin hydrolysate (Lipotin NE of the firm Lukas Meyer, Hamburg, Germany);

($B_{15}$) addition product of 40 moles of ethyleneoxide to 1 mole of a fatty alcohol mixture (oleylalcohol/cetylalcohol 2:1);

($B_{16}$) reaction product of 1 mole of monochloroacetic acid with the addition product of 12 moles of ethyleneoxide to 1 mole of a fatty alcohol mixture (oleylalcohol/cetylalcohol 2:1).

Surfactants ($B_2$):

($B_{21}$) condensation product of 2 moles of stearic acid and 1 mole of diethanolamine;

($B_{22}$) condensation product of 1.5 moles of stearic acid and 1 mole of N-(β-aminoethyl)-ethanolamine;

($B_{23}$) condensation product of 1.3 moles of stearic acid and 1 mole of glycerine.

EXAMPLE 1 [intermediate ($A_{01}$)]

To 930 parts of stearyl-poly(15)-ethyleneglycolether there are added dropwise at 65°–70° C. and after addition of 9.3 parts of borontrifluoride-etherate 92.6 parts of epichlorohydrin within about 30 minutes. After 1½ hours 16 parts of monoethanolamine and 133 parts of a 40% sodium hydroxide solution are added dropwise thereto. After a further hour at 80° C. the product is cooled and discharged. There are obtained 1225 parts of a yellowish white hard paste with an active substance content of 85.4%. It corresponds to the formula

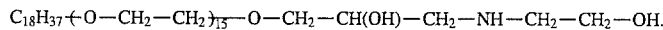

$$C_{18}H_{37}\mathord{-}(O-CH_2-CH_2)_{\overline{15}}-O-CH_2-CH(OH)-CH_2-NH-CH_2-CH_2-OH.$$

EXAMPLE 2

[surfactant ($A_{11}$)] 58.3 parts of monochloroacetic acid sodium salt are metered at 75° C. into 613 parts of intermediate ($A_{01}$) without allowing the temperature to rise above 85° C. After 1½ hours the hot mass is discharged. There are obtained 660 parts of product with an active substance content of 78.0%.

EXAMPLE 3

[surfactant ($A_{12}$)]

Example 2 is repeated with the difference that instead of 58.3 parts of monochloroacetic acid sodium salt there are employed 116.6 parts thereof and the mixture is allowed to react for 3 hours instead of 1½ hours.

EXAMPLE 4

[surfactant ($A_{13}$) and ($A_{14}$)]

Examples 1, 2 and 3 are repeated, with the difference that instead of stearyl-poly(15)-ethyleneglycolether there is employed the equivalent amount of stearyl-poly(11)-ethyleneglycolether.

EXAMPLE 5

[surfactant ($A_{16}$)]

99 parts of 3-chloro-2-hydroxypropanesulphonic acid sodium salt are poured within 15 minutes at 70° C. into 465 parts of intermediate ($A_{01}$). Stirring is continued for 5 hours at 85° C. and then the product is discharged. There are obtained 555 parts of product with an active substance content of 94.6%.

EXAMPLE 6

[surfactant ($A_{15}$)]

Examples 1 and 5 are repeated with the difference that instead of stearyl-poly(15)-ethyleneglycolether there is employed the equivalent amount of behenyl-poly(18)-ethyleneglycolether.

EXAMPLE 7

[surfactant ($A_{17}$)]

Examples 1 and 2 are repeated with the difference that instead of monoethanolamine there is employed the equivalent amount of diethanolamine.

EXAMPLE 8

[surfactant ($A_{29}$)]

220 parts of water, 330 parts of hexyleneglycol, 756 parts of N-[3-(N,N'-dimethylamino)-propyl]-stearic acid amide are admixed and heated to 60° C. 233 parts of monochloroacetic acid sodium salt are added. After a slight heat development stirring is continued for 3 hours at 70°–75° C. A titration of chlorine ions shows a degree of reaction of 97%. There are obtained 1539 parts of product with an active substance content of 55.6%.

EXAMPLE 9

[Dispersion ($D_1$)]

90 parts of intermediate product ($A_{01}$) and 60 parts of N-[3-(dimethyl-amino)-propyl]-stearic acid amide are heated to 75° C. and reacted with 27.5 parts of monochloroacetic sodium salt- to form a mixture of the surfactant ($A_{29}$) and ($A_{11}$)—. After 1–2 hours the mixture is heated to 105° C. 71.5 parts of wax ($W_1$), 18.7 parts of paraffin oil, 28 parts of hexyleneglycol and 10 parts of triethanolamine are added thereto. When a homogeneous melt is formed a solution of 14 parts of surfactant ($B_{11}$), 4 parts of surfactant ($B_{14}$) and 0.2 parts of silicone defoamer VF 1169 (WACKER-CHEMIE) in 964 parts of water is added in such a way that the temperature of the melt does not fall below 85° C. During the cooling stage there are further admixed thereto 143 parts of an aqueous surfactant mixture containing 14% of ($B_{21}$), 1.6% of ($B_{22}$), 4.4% of ($B_{12}$), 2.3% of ($B_{13}$) and 2.1% of ($A_{32}$). There are obtained 1430 parts of a yellowish white fluid dispersion.

EXAMPLE 10

[Dispersion ($D_2$)]

114 g of surfactant ($A_{11}$) and 113 g of surfactant ($A_{29}$) are admixed and heated to 105° C. During the heating stage 57.2 g of wax ($W_1$), 20 g of paraffin oil, 10 g of triethanolamine, 14 g of surfactant ($B_{11}$) and 4 g of surfactant ($B_{14}$) are added thereto. When a homogeneous melt has formed 930 g of cold-water are metered thereto in such a way that the temperature of the melt does not fall below 90° C. During the cooling stage there are further added thereto 150 g of an aqueous surfactant mixture containing 14% of ($B_{21}$), 1.6% of ($B_{22}$), 4.4% of ($B_{12}$), 2.3% of ($B_{13}$) and 2.1% of ($A_{32}$). There are obtained 1412 parts of a yellowish white dispersion.

EXAMPLE 10a to 10f

[Dispersions $(D_{2a})$ to $(D_{2f})$]

By replacing in Example 10 the 114 g of surfactant $(A_{11})$ by 0.086 moles (referred to the active substance content) of surfactants $(A_{12})$ to $(A_{17})$ respectively, there are obtained also valuable softeners of good imbibition properties and good whiteness.

EXAMPLE 10g to 10n

[Dispersions $(D_{2g})$ to $(D_{2n})$]

By replacing in Example 9 the 113 g of surfactant $(A_{29})$ by 0.15 moles (referred to active substance contents) of the surfactants $(A_{21})$ to $(A_{28})$, there are also obtained valuable hydrophilic softeners.

EXAMPLE 11

[Dispersion $(D_3)$]

The procedure is carried out as described in Example 9, employing, however, in place of 60 parts of N-[3-(dimethylamino)-propyl]-stearic acid amide, 50 parts of N,N-dimethyl-stearylamine. Further there is employed no paraffin oil and no hexyleneglycol. There are obtained 1373 parts of a creamy dispersion of good application properties.

EXAMPLE 12

[Dispersion $(D_4)$]

The procedure is carried out as described in Example 9, however, employing in place of 27.5 parts of monochloroacetic acid sodium salt, 46.4 parts of powdery 3-chloro-2-hydroxypropanesulphonic acid sodium salt. There are obtained 1392 parts of a dispersion with good application properties.

EXAMPLE 13

[Dispersion $(D_5)$]

Example 9 is repeated with the difference that there are further added to the starting mixture 30 parts of hydroxyethylaminoethyl-stearic acid amide and carboxymethylation is carried with 37.0 parts of chloroacetic acid sodium salt, instead of 27.5 parts thereof. There are obtained 1469 parts of a dispersion with excellent softener properties.

EXAMPLE 14

[Dispersion $(D_6)$]

40 parts of intermediate $(A_{01})$ and 30 parts of N-[3-(dimethylamino)-propyl]-stearic acid amide are reacted with 14 parts of monochloroacetic acid sodium salt, as described in Example 9. Then 30 parts of wax $(W_1)$, 0.5 parts of silicone defoamer WF 1169 (WACKER CHEMIE) and 5 parts of triethanolamine are added at 105° C. When a homogeneous melt has formed, 20 parts of surfactant (B23) and 5 parts of surfactant $(B_{15})$ are added thereto. Then 350 parts of demineralized water are added thereto in such a way that the temperature does not fall below 85° C. This mass is then added with stirring into a solution of 5 parts of surfactant $(B_{14})$ in 380.5 parts of demineralized water at 75° C. and then cooled. At 35° C. 120 parts of an aqueous surfactant mixture containing 14% of $(B_{21})$, 1.6% of $(B_{22})$, 4.4% of $(B_{12})$, 2.3% of $(B_{13})$ and 2.1% of $(A_{32})$ are finally added thereto. There are obtained 1000 parts of a yellowish white fluid dispersion.

EXAMPLE 15

[Dispersion $(D_7)$]

25 parts of intermediate $(A_{01})$ and 35 parts of N-[3-(dimethylamino)-propyl]-stearic acid amide are reacted as described in Example 9, in the presence of 10 parts of paraffin oil and 0.4 parts of silicone defoamer WF 1169 (WACKER CHEMIE), with 14 parts of monochloroacetic acetic sodium salt. Then 30 parts of wax $(W_1)$ and 5 parts of triethanolamine are added at 105° C. When a homogeneous melt has formed 41 parts of surfactant $(B_{23})$ and 4 parts of surfactant $(B_{15})$ are added thereto. Then 450 parts of demineralized water are added in such a way that the temperature does not fall below 85° C. This mass is stirred into a solution of 5 parts of surfactant $(B_{16})$ in 255,6 parts of demineralized water of 75° C. and then cooled. At 35° C. 100 parts of an aqueous surfactant mixture containing 14% of surfactant $(B_{21})$, 1.6% of surfactant $(B_{22})$, 4.4% of surfactant $(B_{12})$, 2.3% of surfactant $(B_{13})$ and 2.1% of surfactant $(A_{32})$ and 25 parts of an aqueous 40% solution of cumolsulphonate sodium salt are finally admixed at 35° C. therewith. There are obtained 1000 parts of a yellowish white fluid dispersion.

EXAMPLE 16

[Composition $(T_1)$]

The procedure is carried out as described in Example 9, however, without addition of water. Further, instead of 143 parts of the aqueous surfactant mixture, 35.8 parts of dry surfactant mixture are employed. This melt is directly discharged. There are obtained 358.8 parts of a solid paste $(T_1)$.

Before application 10 parts of this paste are heated with 35.5 parts of water to 80° C., stirred well during 15 minutes and then cooled again. The obtained dispersion corresponds to the one obtained in Example 9.

In analogous way as the composition $(T_1)$ is produced, the components of dispersions $(D_2)$ to $(D_7)$ may be produced in form of dry compositions $(T_2)$ to $(T_7)$ which, like composition $(T_1)$, may be diluted with hot water to corresponding dispersions.

Application Example A

A bleached and optically brightened dry cotton terry cloth sample (commercial material) with a weight of 50 g is padded to a 75% pick-up with a liquor of 20 g/l of dispersion $(D_1)$ of Example 9 and 0.2 g/l of the addition product of 6 moles of ethyleneoxide to 1 mole of isotridecylalcohol. After drying on a tenter-frame at an air-circulation temperature of 140°–150° C. and conditioning there is obtained a very good soft handle and a very good imbibition property (a water drop is absorbed immediately). The whiteness is optimal.

Analogously as dispersion $(D_1)$ each of the dispersions $(D_2)$ to $(D_7)$ are employed in Application Example A.

Application Example B

A bleached cotton fabric is padded to a 75% pick-up with an aqueous padding liquor of the following composition:

50 g/l of N,N'-dimethylol-dihydroxyethylene urea, 12 g/l of magnesiumchloride hexahydrate and 40 g/l of dispersion $(D_2)$ and then dried with circulating air of 140° C. and condensed for 5 minutes at 160° C. There is obtained a crease-proof finished fabric of good dimensional stability, pleasant soft handle and excellent hydrophilicity.

Analogously as dispersion ($D_2$) each of dispersions ($D_1$) and ($D_{2a}$) to ($D_7$) are employed in Application Example B.

Application Example C

A bleached cotton fabric is padded to a 75% pick-up with an aqueous padding liquor of the following composition:

25 g/l of dispersion ($D_1$)
and 1.3 g/l of the optical brightener 4,4'-bis-[2"-phenylamino-4"-N,N-bis-(β-hydoxypropyl)-amino- 1", 3", 5"-triazinyl-6"-amino] -stilbene-2,2', 4''', 4''''-tetrasulphonic acid tetra sodium salt
and dried in circulating air of 140° C. There is obtained a fabric of pleasant soft-handle, excellent hydrophilicity and high whiteness.

Analogously as the dispersion ($D_1$) each of dispersions ($D_2$) to ($D_7$) are employed in Application Example C.

I claim:

1. A water-dilutable wax composition comprising
   a wax
   (W) which is an oxidized and optionally partially saponified hydrocarbon wax or a mixture of such waxes
   and a surfactant
   ($A_1$) which is at least one amphoteric surfactant that contains a polyethylene-glycolether chain.

2. The composition (P) according to claim 1, wherein ($A_1$) contains a lipophilic substituted polyethyleneglycolether chain and a monocationic amphoteric group, which is free of polyglycolether chains and which is bound to the polyglycolether chain, optionally over a non-ionic bridge.

3. The composition (P) according to claim 2, wherein ($A_1$) which, when an inner salt form corresponds to the average formula

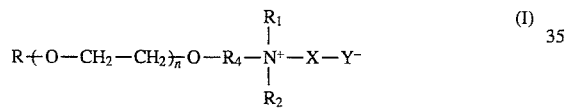
(I)

in which
R signifies a radical R' or a radical of the formula R"—CO—,
$R_1$ signifies $C_{1-4}$-alkyl, $C_{2-3}$-hydroxyalkyl, benzyl or —X—YM,
$R_2$ signifies hydrogen, $C_{1-4}$-alkyl, $C_{2-3}$-hydroxyalkyl, benzyl or —X—YM,
or $R_1$ and $R_2$ together with the nitrogen to which they are bound form a morpholinium ring,
R' signifies an aliphatic hydrocarbon radical with 12 to 24 carbon atoms,
R" signifies an aliphatic hydrocarbon radical with 11 to 23 carbon atoms,
O-$R_4$ signifies a radical of the formula —O—$CH_2$—CH(OH)—$CH_2$— or —O—$CH_2$—CO—NH—Z—,
X signifies $C_{1-4}$-alkylene or β-hydroxy-$C_{3-4}$-alkylene,
$Y^-$ signifies —$COO^-$ or -$SO_3^-$,
YM signifies —COOM or —$SO_3$M,
M signifies hydrogen or a colourless cation,
Z signifies $C_{2-6}$-alkylene and n signifies a number of from 5 to 30 and, if the molecule contains more than one radical Y, at most one signifies $SO_3$.

4. The composition (P) according to claim 1, further containing
   (A') which is at least one monocationic amphoteric surfactant, which is free of polyethyleneglycolether chains and contains at least one lipophilic radical.

5. The composition (P) according to claim 4, wherein (A') comprises
   ($A_2$) which is at least one amphoteric surfactant having a generic betaine structure that contains no polyethyleneglycolether chains.

6. The composition (P) according to claim 5, in which ($A_2$) which, when in an inner salt form corresponds to formula

(II)

wherein
$R_o$ independently from R signifies a radical R' or a radical of the formula R'—O—$R_4$— or of the formula R"—CO—NH—Z— and
$R_3$ signifies $C_{1-4}$-alkyl, $C_{2-3}$-hydroxyalkyl, benzyl or —X—YM or
$R_1$ and $R_3$ together with the nitrogen to which they are bound signify a morpholinium ring
and, if the molecule contains more than one group Y, at most one signifies $SO_3$.

7. The composition (P) according to claim 4, wherein (A') comprises
   ($A_3$) which is at least one non-quaternary amphoteric surfactant that contains no polyethyleneglycolether chain.

8. The composition (P) according to claim 7, wherein ($A_3$) which, when in an inner salt form corresponds to formula

(III)

9. The composition (P) according to claim 1, further comprising
   (B) which is at least one non-ionic surfactant, at least one weakly-cationic surfactant or/and at least one weakly anionic surfactant.

10. The composition (P) according to claim 9, wherein (B) comprises
    ($B_2''$) which is at least one fatty acid mono- or diglyceride.

11. The composition (P) according to claim 1, further containing
    (C) which is a defoamer, at least one oil, at least one solubilizer or/and at least one fluidizing agent.

12. The composition (P) according to claim 1, which is an aqueous dispersion (D) or a dry composition (T).

13. The composition according to claim 1, consisting essentially of (W), (A) and optionally (B), which is at least one non-ionic surfactant, one weakly cationic surfactant and/or at least one weakly anionic surfactant, or (C), which is a defoamer, an oil, a solubilizer and/or a fluidizing agent, or water (D), or (B) and (C), or (B) and (D), or (C) and (D), or (B), (C) and (D).

14. An amphoteric surfactant mixture comprising at least one amphoteric surfactant that contains a polyethylene glycol ether chain ($A_1$), and at least one monocationic amphoteric surfactant, which is free of polyethylene glycol ether chains and contains at least one lipophilic radical (A').

15. An amphoteric surfactant mixture comprising at least one amphoteric surfactant that contains a polyethylene glycol ether chain ($A_1$) and at least one amphoteric surfactant having a generic betaine structure that contains no polyethylene glycol ether chains ($A_2$).

16. An amphoteric surfactant mixture comprising at least one amphoteric surfactant that contains a polyethylene glycol ether chain ($A_1$), and at least one non-quarternary amphoteric surfactant that contains no polyethylene glycol ether chain ($A_3$).

17. The amphoteric surfactant mixture according to claim 15, further comprising at least one non-quarternary amphoteric surfactant that contains no polyethyleneglycolether chain ($A_3$).

18. The process for the production of a polyethyleneglycolether- containing amphoteric surfactant, wherein a mixture of polyglycolether-chain-containing and polyglycolether-chain-free surfactants, which contain each an optionally protonated basic amino group, are reacted with reactants capable of introducing anionic groups.

19. A process for the finishing of fibrous material, comprising contacting the fibrous material with an effective finishing amount of a composition (P) according to claim 1.

20. The process according to claim 19 wherein the fibrous material is textile material of natural or regenerated cellulose.

21. The process according to claim 19, in which (P) is employed together with an optical brightener.

22. The process according to claim 19, in which (P) is employed together with a non-ionic or basic finish.

23. The process according to claim 19 carried out simultaneously with a synthetic resin finishing and an optical brightening.

24. The composition according to claim 13 which has a pH in the range of 4 to 8.5 when water (D) is present.

* * * * *